US 6,679,538 B1

(12) United States Patent
Sturt

(10) Patent No.: US 6,679,538 B1
(45) Date of Patent: Jan. 20, 2004

(54) ENERGY MANAGING SUN VISOR MOUNTING ARRANGEMENT

(75) Inventor: Alan Sturt, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/264,696

(22) Filed: Oct. 4, 2002

(51) Int. Cl.[7] .................................................. B60J 3/00
(52) U.S. Cl. .................................. 296/97.9; 296/187.05
(58) Field of Search ............................... 296/97.9, 97.1, 296/97.2, 214, 146.7, 187.01, 187.03, 187.05; 224/312, 318

(56) References Cited

U.S. PATENT DOCUMENTS

| | | | | |
|---|---|---|---|---|
| 4,178,035 A | | 12/1979 | Cziptschirsch | |
| 4,598,943 A | | 7/1986 | Scholz et al. | |
| 4,765,674 A | | 8/1988 | Svensson | |
| 4,981,322 A | * | 1/1991 | Dowd et al. | 296/214 |
| 5,082,323 A | * | 1/1992 | Dowd et al. | 296/214 |
| 5,636,891 A | * | 6/1997 | Van Order et al. | 296/214 |
| 5,752,853 A | * | 5/1998 | Curtindale | 248/300 |
| 5,967,589 A | * | 10/1999 | Spadafora | 296/97.9 |
| 6,007,136 A | * | 12/1999 | Zittwitz et al. | 296/97.9 |
| 6,021,986 A | * | 2/2000 | Murdock | 296/97.9 |
| 6,179,366 B1 | * | 1/2001 | Hansz | 296/97.9 |
| 6,390,541 B2 | * | 5/2002 | Grimm et al. | 296/214 |
| 6,422,644 B1 | * | 7/2002 | Miller et al. | 296/214 |
| 6,511,029 B2 | * | 1/2003 | Sawayanagi | 296/97.9 |
| 6,511,116 B1 | * | 1/2003 | De Jongh et al. | 296/97.9 |
| 2001/0005088 A1 | | 6/2001 | Hennessey | |
| 2001/0025909 A1 | * | 10/2001 | Sawayangi | 296/97.9 |

* cited by examiner

Primary Examiner—D. Glenn Dayoan
Assistant Examiner—H. Gutman
(74) Attorney, Agent, or Firm—Bill C. Panagos

(57) ABSTRACT

A sun visor mounting arrangement, for supporting a sun visor assembly in a vehicle that has a support structure, includes a deformable sun visor mount adapted to be supported by the support structure. The mounting arrangement further includes a sun visor mounting bracket for supporting the sun visor assembly and configured to be attached to the mount such that the mounting bracket is supported by the mount. When the mounting bracket is subjected to sufficient loading, the mount is configured to plastically deform to thereby manage energy associated with the loading.

20 Claims, 3 Drawing Sheets

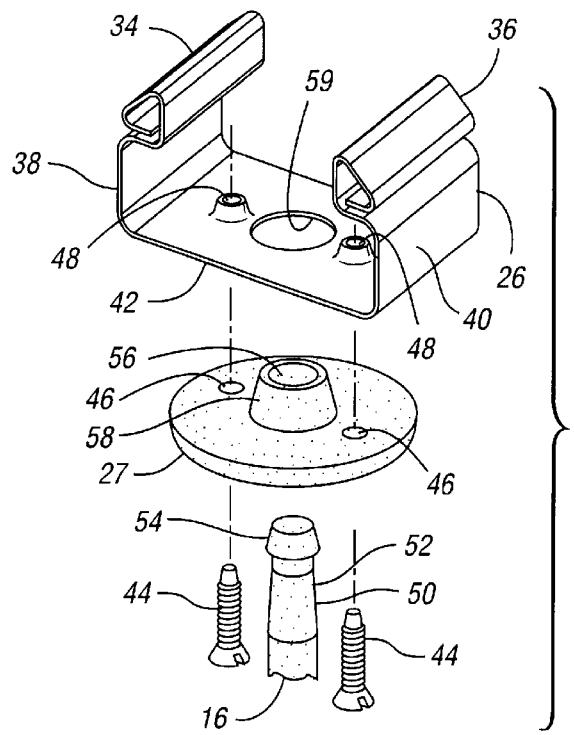
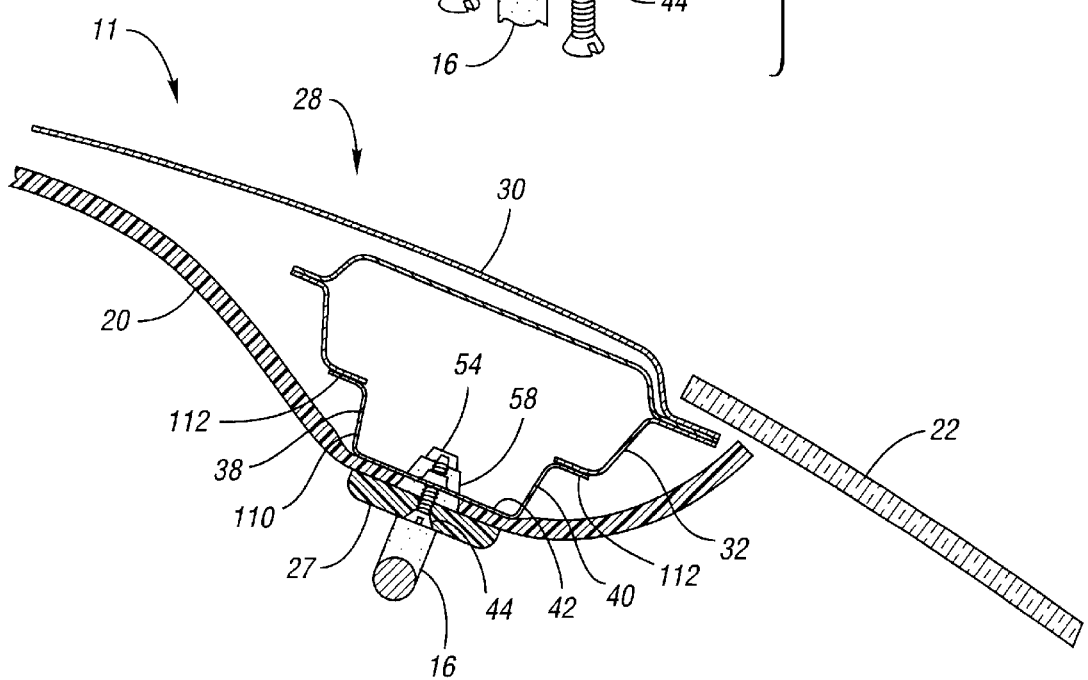

ENERGY MANAGING SUN VISOR MOUNTING ARRANGEMENT

BACKGROUND OF THE INVENTION

1. Field of the Invention

The invention relates to sun visor mounting arrangements.

2. Background Art

Various sun visor mounting arrangements have been developed for supporting a sun visor assembly in a motor vehicle. Examples of such mounting arrangements are disclosed in U.S. Pat. No. 4,178,035 and U.S. patent application Ser. No. 09/766,770, which was published as Publication No. US. 2001/005088.

SUMMARY OF THE INVENTION

Under the invention, a sun visor mounting arrangement is provided for supporting a sun visor assembly in a vehicle that has a support structure. The mounting arrangement includes a deformable sun visor mount adapted to be supported by the support structure. The mounting arrangement further includes a sun visor mounting bracket for supporting the sun visor assembly and configured to be attached to the mount such that the mounting bracket is supported by the mount. When the mounting bracket is subjected to sufficient loading, the mount is configured to plastically deform to thereby manage energy associated with the loading.

BRIEF DESCRIPTION OF THE DRAWINGS

FIG. 3 is an exploded perspective view of the sun visor system of FIG. 2;

FIG. 4 is a cross-sectional view of a second embodiment of the sun visor system showing a second embodiment of the sun visor mount;

DETAILED DESCRIPTION OF THE PREFERRED EMBODIMENT(S)

Figure 1:
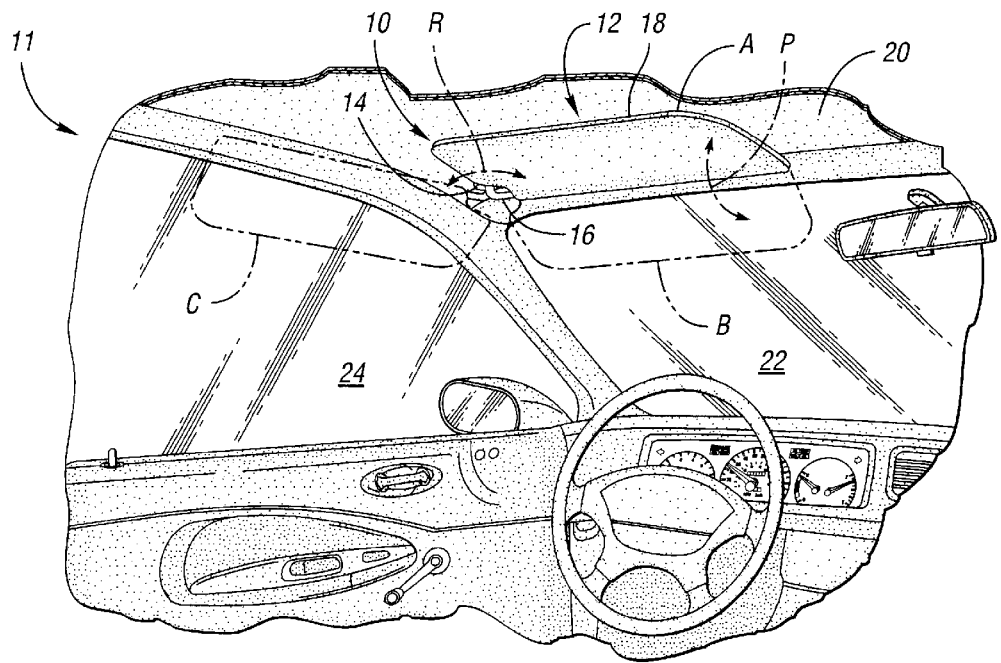
FIG. 1 is a perspective view of a sun visor system according to the invention mounted in a motor vehicle.

FIG. 1 shows a sun visor system 10, according to the invention, for use with a motor vehicle 11. The system 10 includes a sun visor assembly 12 and a sun visor mounting arrangement 14 for supporting the sun visor assembly 12 in the vehicle 11. In the embodiment shown in FIG. 1, the sun visor assembly 12 includes a support arm or rod 16 and a visor body or blade 18 pivotally mounted on the support rod 16 such that the visor blade 18 is pivotable along an arrow P between a stowed position A, adjacent headliner 20, and a first deployed position B (shown in phantom) proximate front windshield 22. In this embodiment, the mounting arrangement 14 is also configured to allow the support rod 16 to rotate along an arrow R, so as to allow the visor blade 18 to rotate between the first deployed position B and a second deployed position C proximate side window 24.

Figure 2:
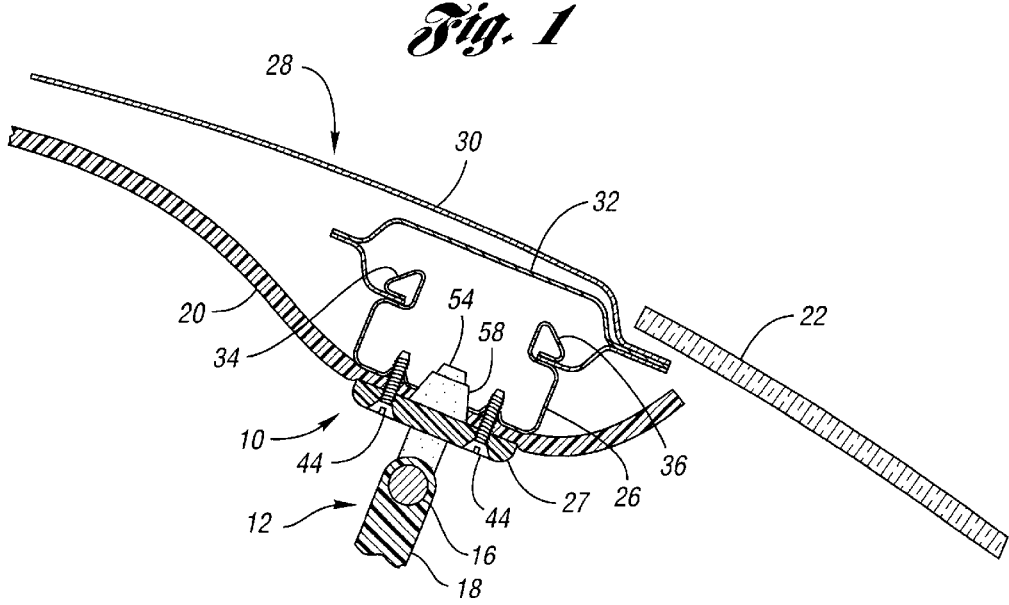
FIG. 2 is a cross-sectional view of the sun visor system including a deformable sun visor mount attached to a roof structure of the vehicle.

Referring to FIGS. 2 and 3, the mounting arrangement 14 includes a deformable sun visor mount 26 and a sun visor mounting bracket 27 attached to the mount 26 such that the mounting bracket 27 is supported by the mount 26. The mount 26 is supported by a vehicle support structure, such as a roof structure 28 that includes a roof panel 30 and a front header 32 attached to the roof panel 30. More specifically, in the embodiment shown in FIGS. 2 and 3, the mount 26 includes first and second fastening members, such as first and second clips 34 and 36, respectively, that extend through an aperture in the front header 32 and snap-fit with the front header 32. Alternatively, the mount 26 may be attached to or supported by the front header 32, or any other suitable support structure such as an A-pillar (not shown), in any suitable manner. For example, the mount 26 may be welded to the front header 32 and/or connected to the front header 32 with fastening elements, such as screws, bolts or rivets. As another example, the mount 26 may be attached to an overhead console (not shown) that is attached to or otherwise supported by the roof structure 28.

The mount 26 may have any suitable configuration sufficient to plastically deform when the mounting bracket 27 is subjected to sufficient loading, such as through a head impact to the sun visor assembly 12. In the embodiment shown in FIGS. 2 and 3, for example, the mount 26 includes first and second side portions 38 and 40, respectively, that extend beneath the first and second clips 34 and 36, respectively, and a base portion 42 extending between the side portions 38 and 40. The side portions 38 and 40, as well as the base portion 42, are made of relatively thin material such that the side portions 38 and 40 may bend when the mounting bracket 27 is subjected to sufficient loading. For example, the mount 26 may be made of steel or aluminum having a thickness less than 2 millimeters (mm). As another example, the mount 26 may be made of steel or aluminum having a thickness of 1 mm or less. Alternatively, the mount 26 may be made of any suitable material having any suitable thickness, such as a thickness greater than 2 mm. In the embodiment shown in FIG. 2, the side portions 38 and 40 are also configured to space the mounting bracket 27 away from the front header 32 by a distance in the range of 5 to 30 millimeters.

The mounting bracket 27 may be attached to the mount 26 in any suitable manner, and is configured to support the sun visor assembly 12. For example, the mounting bracket 27 may be attached to the mount 26 with one or more screws 44 that extend through holes 46 in the mounting bracket 27 and into corresponding holes 48 in the mount 26. In the embodiment shown in FIG. 2, the headliner 20 extends between the mount 26 and the mounting bracket 27 when the mounting bracket 27 is attached to the mount 26.

The sun visor assembly 12 is configured to be attached to the mounting bracket 27 in any suitable manner. For example, the support rod 16 may be snap fit to the mounting bracket 27 such that the support rod 16 is rotatable with respect to the mounting bracket 27. More specifically, referring to FIG. 3, an end 50 of the support rod 16 may be provided with a tapered portion 52 and an enlarged head 54, which is configured to snap fit through an aperture 56 formed in a fastening element, such as a projection 58, of the mounting bracket 27. After assembly, the head 54 rotatably engages the top portion of the projection 58 so as to attach the support rod 16 to the mounting bracket 27.

With the mounting arrangement configuration described above, the mounting bracket 27 is not connected directly to the roof structure 28, but rather is spaced away from the roof structure 28 by the mount 26. Because the mount 26 is configured to plastically deform when subjected to sufficient loading, the mount 26 effectively manages or absorbs energy associated with impacts to the sun visor assembly 12.

To assemble the system 10, the sun visor assembly 12 may first be attached to the mounting bracket 27. Next, the mounting bracket 27 may be positioned proximate the headliner 20 such that the support rod 16 extends through an aperture in the headliner 20. The mounting bracket 27 may then be attached to the mount 26 with the screws 44. In the embodiment shown in FIGS. 2 and 3, the projection 58 extends through an aperture 59 of the mount 26 when the mounting bracket 27 is attached to the mount 26. Next, the headliner 20 with the system 10 attached thereto may be installed in the vehicle 11, such that the clips 34 and 36 of the mount 26 snap fit into the aperture of the front header 32.

Alternatively, the system 10 may be assembled in any suitable manner. For example, the mount 26 may first be attached to the front header 32, or any other suitable support structure. Next, the mounting bracket 27 having the sun visor assembly 12 attached thereto, may be fastened to the mount 26.

Referring to FIG. 4, a second embodiment 110 of the mount is shown. As with the mount 26, the mount 110 is useable with the mounting bracket 27 for attaching the sun visor assembly 12 to vehicle 11. Furthermore, the mount 110 is similar to the mount 26 and includes similar features that are identified with the same reference numbers. The mount 110, however, includes, attachment flanges 112 that may be attached to a vehicle support structure, such as front header 32, in any suitable manner. For example, the flanges 112 may be welded to the front header 32 and/or attached with fasteners to the front header 32.

Figure 5:
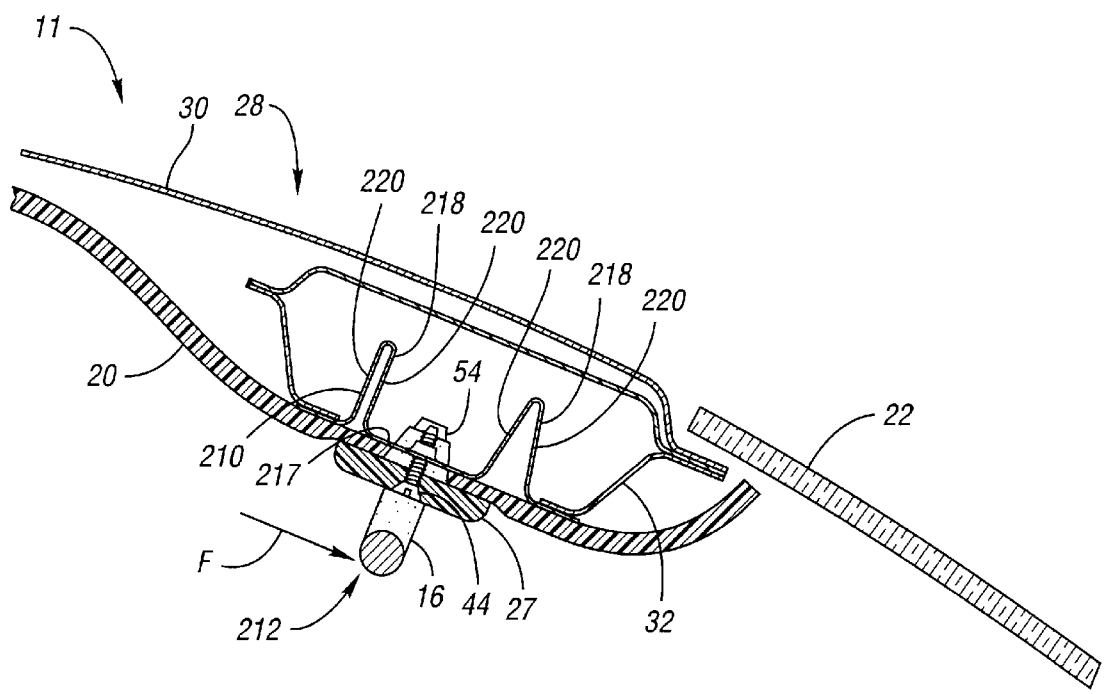
FIG. 5 is a cross-sectional view of a third embodiment of the sun visor system showing a third embodiment of the sun visor mount.
Figure 6:
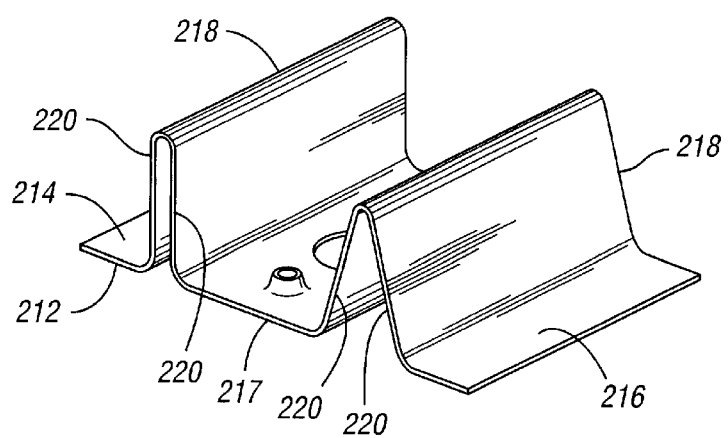
FIG. 6 is a perspective view of the sun visor mount shown in FIG. 5.

Referring to FIGS. 5 and 6, a third embodiment 210 of the mount is shown for attaching the sun visor assembly 12 to vehicle 11. The mount 210 includes a mount body 212 having first and second ends 214 and 216, respectively, which may be attached to a vehicle support structure, such as front header 32, in any suitable manner. For example, the ends 214 and 216 may be welded to the front header 32 and/or attached with fasteners to the front header 32. The mount body 212 also includes a base portion 217 and one or more folds 218 disposed between the ends 214 and 216. In the embodiment shown in FIGS. 5 and 6, for example, the mount body 212 includes two folds 218. Furthermore, in the embodiment shown in FIGS. 5 and 6, each fold 218 extends upwardly from the base portion 217 and has a height in the range of 5 to 30 mm.

Each fold 218 includes two legs 220 that cooperate to absorb or otherwise manage energy associated with an impact to the sun visor assembly 12. For example, the legs 220 of a particular fold 218 may bend when the sun visor assembly 12 is subjected to sufficient loading. Alternatively or supplementally, the legs 220 of a particular fold 218 may separate or move closer together when the sun visor assembly 12 is subjected to sufficient loading. More specifically, referring to FIG. 5, a force F applied in a forward direction on the sun visor assembly 12 may cause the legs 220 of the forward most fold 218 to move closer together, while causing the legs 220 of the rearward most fold 218 to separate.

As with the mount 26 and the mount 110, the mount 210 may be made of any suitable material having any suitable thickness. For example, the mount 210 may be made of steel or aluminum having a thickness of 2 mm or less. As another example, the mount 210 may be made of steel or aluminum having a thickness of 1 mm or less.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A sun visor mounting arrangement for supporting a sun visor assembly in a vehicle that has a support structure, the mounting arrangement comprising:

a deformable sun visor mount adapted to be supported by the support structure; and a sun visor mounting bracket for supporting the sun visor assembly and configured to be attached to the mount such that the mounting bracket is supported by the mount;

wherein the mount has a base portion to which the mounting bracket attaches, and first and second side portions that extend upwardly from the base portion, the side portions of the mount being configured to space the mounting bracket away from the support structure by a distance in the range of five to thirty millimeters, and wherein the mount is configured to plastically deform when the mounting bracket is subjected to sufficient loading to thereby manage energy associated with the loading.

2. The mounting arrangement of claim 1 wherein the mount has a thickness of less than two millimeters.

3. The mounting arrangement of claim 1 wherein the mount has a thickness of about one millimeter.

4. The mounting arrangement of claim 1 wherein the mount is adapted to snap fit to the support structure.

5. The mounting arrangement of claim 4 wherein the mount includes first and second clips that are adapted to snap fit to the support structure.

6. The mounting arrangement of claim 1 wherein the mount extends between the mounting bracket and the support structure when the mount is supported by the support structure and the mounting bracket is attached to the mount.

7. The mounting arrangement of claim 1 wherein the mounting bracket is removably attachable to the mount.

8. A vehicle comprising:

a support structure;

a deformable sun visor mount supported by the support structure;

a sun visor mounting bracket attached to the mount such that the mounting bracket is supported by the mount; and a sun visor assembly attached to the mounting bracket;

wherein the mount has a base portion to which the mounting bracket is attached, and first and second side portions that extend upwardly from the base portion, the side portions of the mount being configured to space the mounting bracket away from the support structure by a distance in the range of five to thirty millimeters, and wherein the mount is configured to plastically deform when the sun visor assembly is subjected to sufficient loading to thereby manage energy associated with the loading.

9. The vehicle of claim 8 wherein the mount has a thickness of less than two millimeters.

10. The vehicle of claim 8 wherein the mount has a thickness of about one millimeter.

11. The vehicle of claim 8 wherein the mount is snap fit to the support structure.

12. The vehicle of claim 11 wherein the mount includes first and second clips, and the support structure includes at least one aperture that receives the clips.

13. The vehicle of claim 8 wherein the mount extends between the mounting bracket and the support structure.

14. The vehicle of claim 8 further comprising a headliner that extends between the mount and the mounting bracket.

15. The vehicle of claim 8 wherein the mounting bracket is removably attached to the mount.

16. The vehicle of claim 8 wherein the mount comprises metal.

17. The mounting arrangement of claim 1 wherein the first and second side portions are configured to plastically deform by bending when the mounting bracket is subjected to the loading.

18. The mounting arrangement of claim 1 wherein the mount is configured to space the mounting bracket away from the support structure such that the mounting bracket is not attached directly to the support structure when the mounting bracket is attached to the mount, and wherein the mount and the mounting bracket are configured to allow a support arm of the sun visor assembly to rotate with respect to the vehicle when the mounting arrangement is supporting the sun visor assembly.

19. The vehicle of claim 8 wherein the first and second side portions are configured to plastically deform by bending when the sun visor assembly is subjected to the loading.

20. The vehicle of claim 8 wherein the mount spaces the mounting bracket away from the support structure such that mounting bracket is not attached directly to the support structure, and wherein the sun visor assembly includes a support arm attached to the mounting bracket, the mount and the mounting bracket being configured to allow the support arm to rotate.

* * * * *